(12) United States Patent
Allen

(10) Patent No.: US 6,686,997 B1
(45) Date of Patent: Feb. 3, 2004

(54) APPARATUS AND A METHOD FOR PULSE DETECTION AND CHARACTERIZATION

(75) Inventor: John B. Allen, Lucas, TX (US)

(73) Assignee: Raytheon Company, Lexington, MA (US)

(*) Notice: Subject to any disclaimer, the term of this patent is extended or adjusted under 35 U.S.C. 154(b) by 164 days.

(21) Appl. No.: 09/941,298

(22) Filed: Aug. 27, 2001

(51) Int. Cl.[7] .................. G02B 27/32; G01R 23/00; G01R 23/17; G01R 31/302; H04J 14/00
(52) U.S. Cl. ............ 356/256; 324/76.19; 324/76.36; 324/76.37; 324/96; 324/750; 324/753; 359/123; 359/124; 359/189; 359/190; 359/191; 359/195
(58) Field of Search .................. 356/256; 324/76.19, 324/76.36, 76.37, 96, 750–753; 359/123, 124, 189–195

(56) References Cited

U.S. PATENT DOCUMENTS

| | | | |
|---|---|---|---|
| 4,241,455 A | * 12/1980 | Eibner | |
| 4,420,842 A | * 12/1983 | Kuhn | |
| 5,166,598 A | 11/1992 | Gallegos et al. | 324/77 K |
| 5,267,188 A | 11/1993 | Pape et al. | 364/827 |
| 5,717,401 A | 2/1998 | Sabet-Peyman et al. | 342/192 |
| 6,137,612 A | * 10/2000 | Startup | |
| 6,466,159 B1 | * 10/2002 | Rotgans | |

OTHER PUBLICATIONS

PCT Report for PCT/US 02/26912, 6 pages, dated Jul. 3, 2003.

* cited by examiner

Primary Examiner—Frank G. Font
Assistant Examiner—Khaled Brown
(74) Attorney, Agent, or Firm—Baker Botts L.L.P.

(57) ABSTRACT

An optical/analog/digital pulse detector receives an input signal and drives a Bragg cell illuminated by a collimated light beam. The Bragg cell spatially modulates the collimated light beam and upon exiting the Bragg cell is imaged by lenses of an optics network to the plane of an opaque plate. A binary optical plate replicates the image of the Bragg cell on the opaque plate. The opaque plate contains slits of various lengths located where the images of the Bragg cell are replicated. To obtain the power spectrum of each of the images on the opaque plate an anamorphic lens is positioned in the path of light passing through the opaque plate. Light passing through the anamorphic lens is sensed by a detector array having outputs coupled to a focal plane processor that processes the analog outputs from the detector array into initial tuning commands for detection and characterization of pulses in the input signal.

22 Claims, 7 Drawing Sheets

APPARATUS AND A METHOD FOR PULSE DETECTION AND CHARACTERIZATION

TECHNICAL FIELD OF THE INVENTION

This invention relates to pulse detection in an input signal containing pulses of various modulation and duration, and more particularly to pulse detection and characterization by optical, analog and digital processing.

BACKGROUND OF THE INVENTION

A pulse detector receives an input signal containing pulses of duration ranging from a few nanoseconds or less to several milliseconds or more and modulation such as chirped, phase shift keying, and frequency shift keying and an additive Gaussian noise. The output signal of a pulse detector is a signal that identifies the time of occurrence and the duration, i.e. the time interval, and the bandwidth and center frequency, i.e. the frequency interval, of each pulse in the input signal.

Prior systems to detect pulses in an input signal rely upon digital technology. The prior digital systems implemented the well known "matched detection matrix" (MDM) algorithm, or variations of that algorithm, for detecting pulses in an electronic input signal. The MDM algorithm effectively searches for concentrations of energy in the time domain and the frequency domain. The portion of the time record where energy is found indicates the time interval where a pulse may exist. The location of energy in the frequency domain represents the frequency interval where the pulse exists.

In order to accurately find the time interval and the frequency interval, many time and frequency intervals must be searched to detect and locate signal energy. The computational load to search these time and frequency intervals can be far greater than a conventional digital computer can provide. Thus, there is a need for a pulse detection system to efficiently implement the MDM algorithm by searching many time and frequency intervals which is faster and requires less weight, volume, power and cost as compared to previous all digital processors.

SUMMARY OF THE INVENTION

In accordance with the present invention, there is provided a method and apparatus for implementing the MDM algorithm utilizing a hybrid optical, electrical analog, and digital processor.

The matched detection matrix (MDM) pulse detector of the present invention utilizes a collimated and coherent beam of light to illuminate a Bragg cell which is driven by an input signal containing pulses of various modulation and duration. The Bragg cell in response to the input signal modulates the collimated beam of light.

An optical plate comprising a plurality of elongated openings having selected lengths is positioned to receive the modulated beam of light after passing through an optical lens configuration. The optical lens configuration is positioned in the path of the spatially modulated collimated light beam to form an image of the beam leaving the Bragg cell on the plane of the optical plate. A holographic element is positioned in the path of the imaged beam and near the optical lens to replicate an image of the Bragg cell aperture a plurality of times in the plane of the optical plate.

A second optical lens configuration in the path of the spatially modulated beam of light is positioned down stream from the optical plate. The second optical lens configuration generates the spatial Fourier transform of the light distribution thereby resulting in the intensity of light in the focal plane of the second optical lens configuration to be proportional to the power spectral density of the signal modulating the Bragg cell as modified by the optical plate. A detector array in the focal plane of the second optical lens configuration responds to the light intensity to identify pulses in the input signal including the location of the time and frequency intervals of each pulse.

Further in accordance with the present invention, there is provided a focal plane processor following each detector to implement the matched detection matrix pulse detector that comprises a frequency integrator for selected ones of a plurality of images on an optical plate. The detector and focal plane processor further include a time integrator for selected ones of the plurality of images on the optical plate. In addition, there is included a tuning command selector for selected ones of the plurality of images.

The time integrator of the focal plane processor comprises a gain control responsive to outputs of each detector in an array on the focal plane. A preamplifier responds to the gain control thereby setting the gain of the preamplifier. The gain control corrects for the gain variations from one detector to the next due to manufacturing inconsistencies and noise spectral variations. The output of each detector is sampled at the Nyquist rate or greater, amplified, stored and subsequently read into a storage element of a multiplexer. The stored samples in the multiplexer are read out and the first storage sample is transferred to a subsequent storage element and the next sample is stored in its place. The next storage sample is then read into the multiplexer and the sum of the samples is computed and read out of the multiplexer. This process is repeated and for each repeat the values will be read from the multiplexer.

The frequency integrator in accordance with the present invention comprises a threshold detector receiving outputs from the multiplexer or the time integrator for comparison to a threshold to identify a frequency band corresponding to a specific time integrator. The time, frequency band, and value resulting from the threshold are transmitted to the tuning command selector. The tuning command selector processes the outputs from the frequency integrator starting with the largest and continuing to the smallest.

The largest is most likely to correspond to a valid pulse. This results in an estimate of the band pass (frequency interval) of a pulse and an estimate of pulse duration and arrival time (time interval).

A technical feature of the present invention is an optical, electrical analog and digital processor for pulse detection implementing the MDM algorithm. The implementation in accordance with the present invention enables data to be processed on a per unit time basis more rapidly than previously implemented all digital techniques. Many more time intervals and frequency intervals can be searched to find the pulse resulting in greater time and frequency location accuracy. In addition, more time and frequency intervals result in a more sensitive pulse detector. A further advantage of the present invention is a method of optical, electrical analog and digital processing for pulse detection in an input signal providing efficient weight, volume, power and costs when compared to previous all digital implementation of a pulse detector.

BRIEF DESCRIPTION OF THE DRAWINGS

A more complete understanding of the pulse detector of the present invention may be had by reference to the following detailed description when taken in conjunction with the accompanying drawings.

DETAILED DESCRIPTION OF THE DRAWINGS

Figure 1:
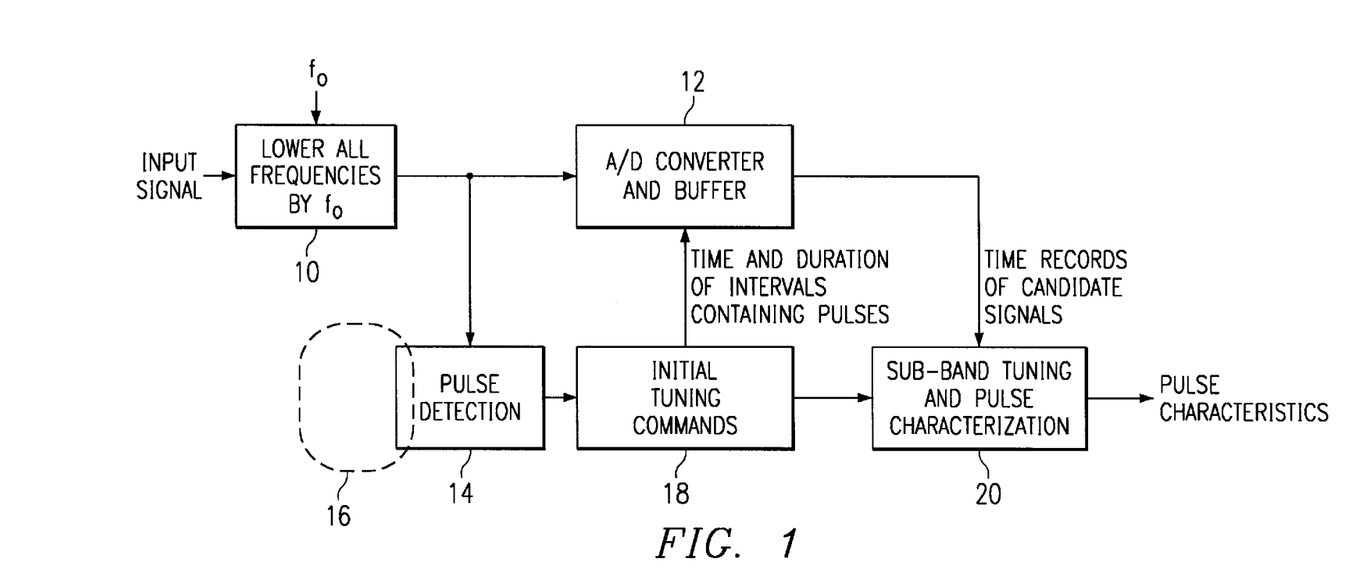
FIG. 1 is a simplified block diagram of a pulse detector receiving an input signal such as a sensor and generating an output signal that characterizes or identifies pulses contained within the input signals.

FIG. 1 shows a schematic of a pulse detector and characterizer utilizing optical/electrical analog/digital processing to detect pulses in an input signal and then characterize the detected pulses. A mixer 10 lowers the frequencies of the signal by $f_o$ so that the center frequency of the signal corresponds to the center frequency of the Bragg cell. The resulting signal is applied to an analog to digital (A/D) converter and buffer 12 that digitizes the signal. Then the buffer temporarily stores the digitized signal. The signal is also input to the pulse detector 14. As will be described, the pulse detector 14 includes optical elements (not shown) and responds to a collimated light beam 16 as an input to the pulse detector. The pulse detector detects the presence of pulses and sends the output thereof, namely, the time and frequency intervals that may contain a pulse, to the initial tuning command processor 18. The initial tuning command processor 18, relays the time intervals likely containing a pulse to the buffer 12. The buffer 12 then sends the digitized records of those time intervals to the sub-band tuner and the pulse characterization operator 20. Portions of the signal stored in the buffer 12 which are not deemed to be pulses by the pulse detector are dumped. The initial tuning command processor 18 also determines whether a candidate pulse is indeed two pulses overlapped both in time and frequency rather than a single pulse. The processor 18 also determines whether the pulses can be considered a pulse train rather than a single pulse. This information, along with the time and frequency intervals, comprise the initial tuning commands. The initial tuning commands are sent to the sub-band tuner and pulse characterizer 20. The sub-band tuner parameters are set by the initial tuning commands. The sub-band tuner filters the corresponding time record from the buffer 12 to reduce the noise associated with the pulse. The pulse characterizer 20 determines the pulse duration, arrival time, amplitude, and type of modulation.

Figure 2:
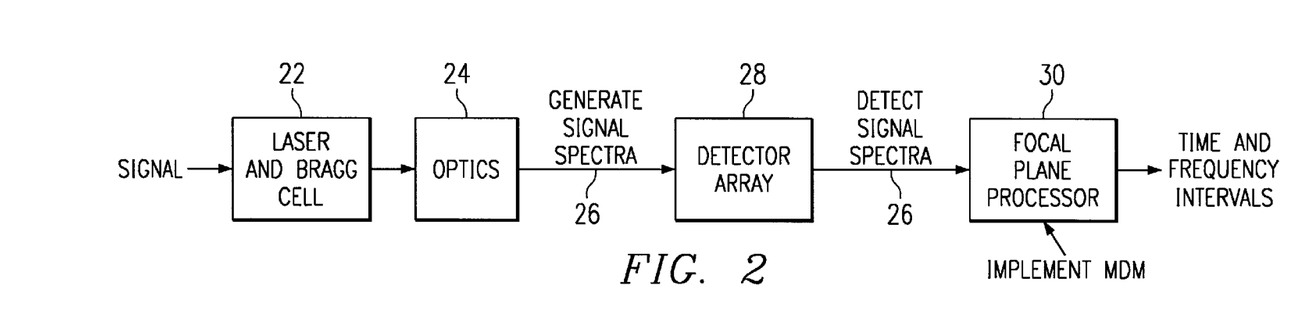
FIG. 2 is a block diagram of the method and apparatus for pulse detection incorporating both optical, electrical analog and digital processing in accordance with the present invention.

Referring to FIG. 2, an input signal containing pulses of various modulations such as chirp, phase shift keying, and frequency shift keying with an arbitrary duration and an additive Gaussian noise is applied to a Bragg cell 22. The Bragg cell 22 receives the collimated light beam 16 to spatially modulate the light beam in accordance with the input signal. Upon exiting the Bragg cell 22, the spatially modulated light beam is applied to optics 24 generating a signal spectra 26 on a detector array 28. The detector array 28 responds to the signal spectra 26 in the form of an analog signal applied to a focal plane processor 30. The focal plane processor 30 implements the matched detection matrix (MDM) algorithm and outputs the time and frequency intervals most likely to contain a pulse.

Figure 3:
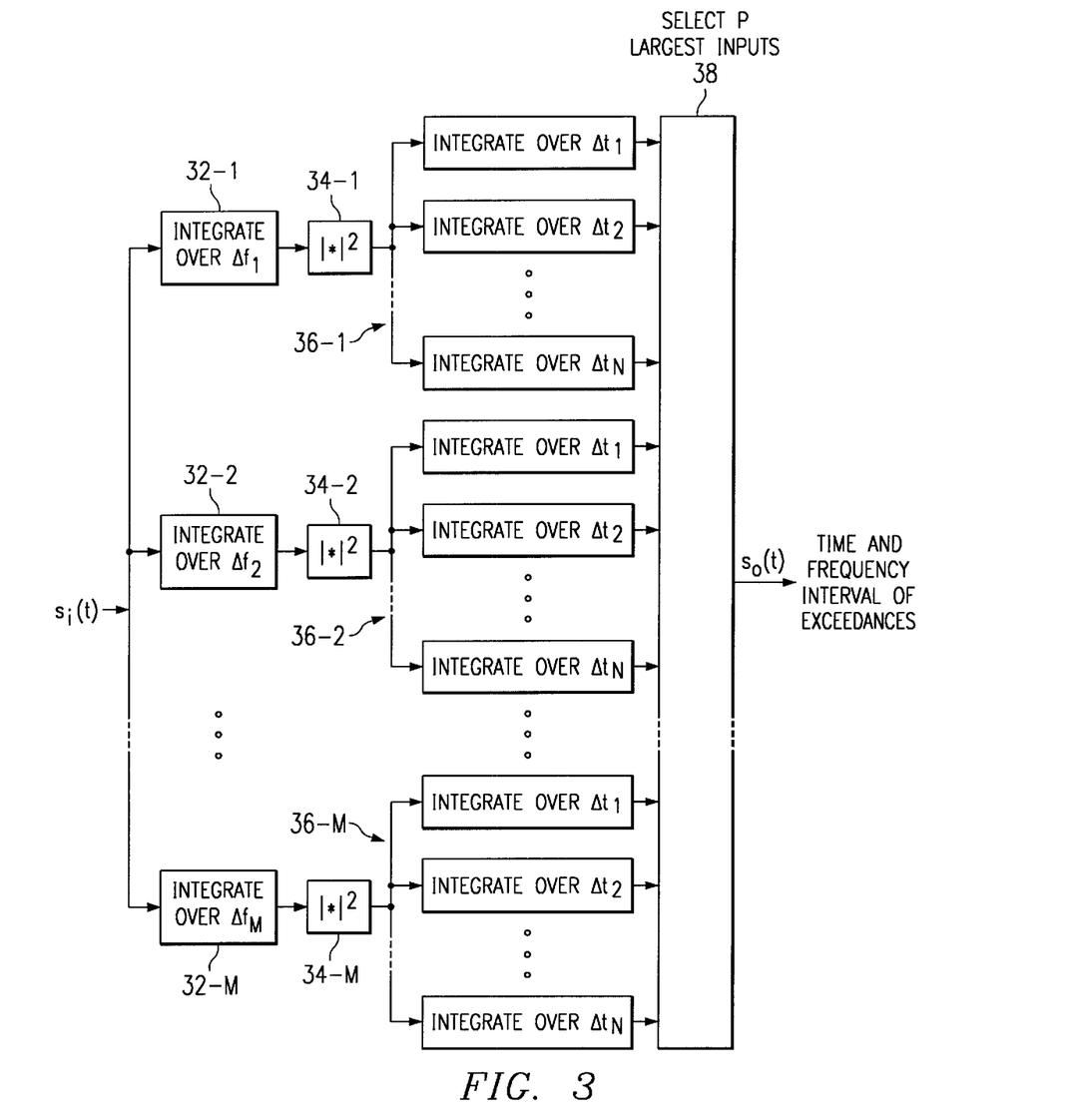
FIG. 3 is a schematic of the matched detection matrix (MDM) algorithm for detecting pulses.

FIG. 3 illustrates the matched detection matrix (MDM) algorithm. An input signal $S_i(t)$ containing pulses for detection as well as noise is applied to a bank of band pass filters 32-1, 32-2 through 32-M over the band passes $\Delta f_1, \Delta f_2, \ldots, \Delta f_M$, respectively. Each band pass represents an interval in frequency. Effectively, the band pass filters integrate the power in the input over that band pass. The band passes are chosen to cover all band passes that may be occupied by the incoming signal. Clearly, the number of band passes can be very large. The goal in algorithm implementation is to integrate over as many band passes as possible. Outputs of the band pass filters 32-1, 32-2 through 32-M are squared in squaring networks 34-1, 34-2 through 34-M and applied to another set of filter banks 36-1, 36-2 through 36-M. These filter banks perform a time integration of duration $\Delta t_I$, where I ranges from 1 to N, on the applied input as illustrated in FIG. 3. The values of $\Delta t_I$ ange over the possible durations of the incoming pulse. Another goal of the algorithm implementation is to integrate over as many time intervals as possible. The maximum output from the time integration filters 36-1, 36-2 through 36-M represents the signal output from the respective band pass filter 32-1, 32-2 through 32-M most closely matching the incoming pulse in bandpass or frequency interval and from the time integration filters having an integration time most closely matching the pulse duration. The time that the maximum value occurs at the output of the time integration filters represents the time of arrival of the pulses in input signal $s_i(t)$. The outputs of the filter banks 36-1, 36-2 through 36-M are applied to a selection network 38 which selects the P-largest input pulses detected in an input signal $S_i(t)$, where P is generally chosen as the number of pulses per unit time that the sub-band tuning and characterization block can process. The output of the selection network 38 is an output signal $S_o(t)$ identifying the time of occurrence and duration (time interval) and the band pass (frequency interval) of the pulses in the original wave form.

Figure 4:
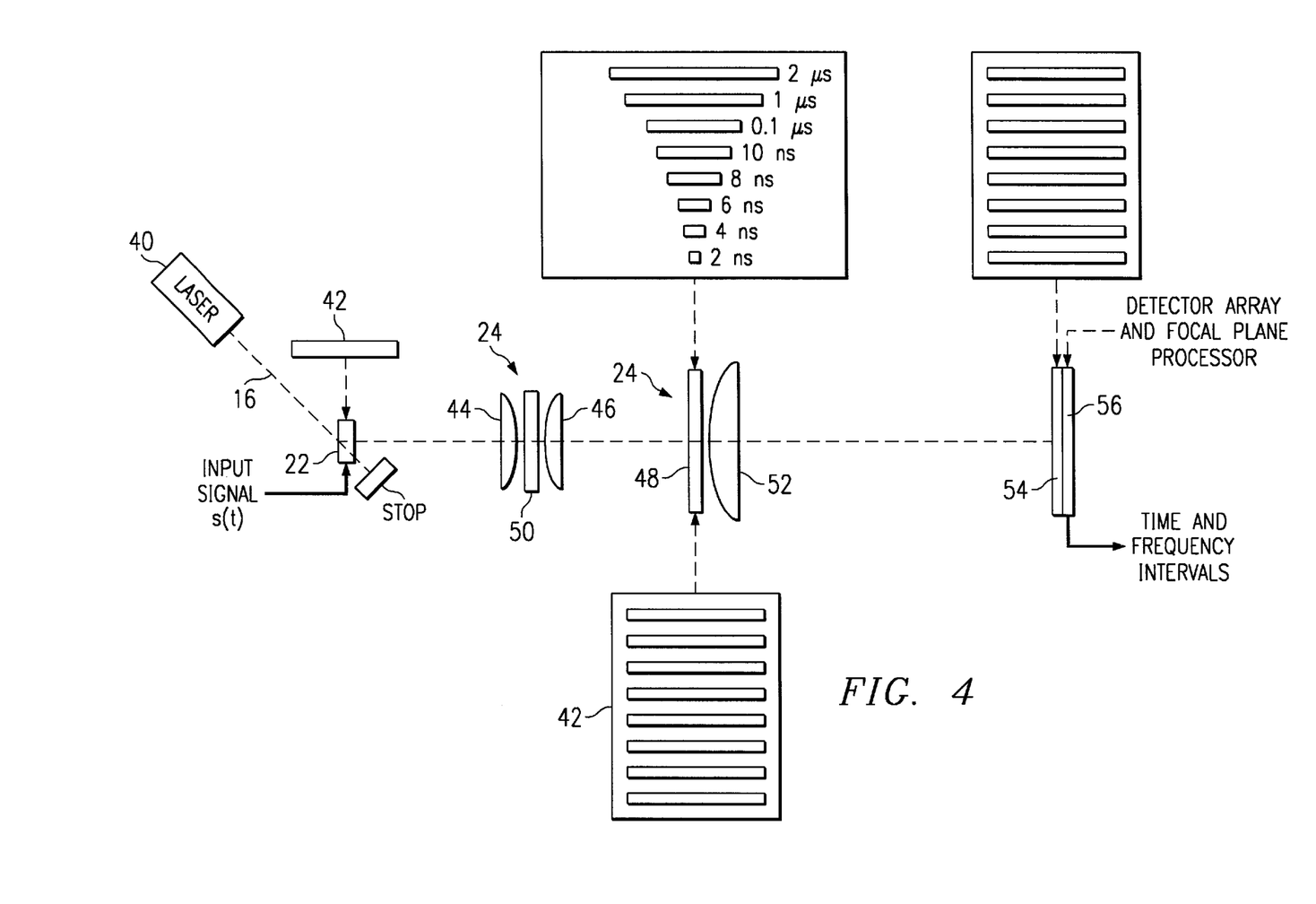
FIG. 4 is a schematic of an optical, electrical analog, and digital processor in accordance with the present invention for implementing pulse detection by means of the MDM algorithm.

In accordance with the present invention, the matched detection matrix (MDM) algorithm is implemented by a hybrid optical, electrical analog and digital processor as illustrated in FIG. 4.

FIG. 4 shows a schematic of an optical/electrical analog/ digital pulse detector in accordance with the present invention. The input signal drives the Bragg cell 22 that is illuminated by a collimated light beam 16 from a laser 40. The Bragg cell 22 has a cell aperture as illustrated at 42 illuminated by the collimated light beam 16. The Bragg cell spatially modulates the collimated light beam 16 passing through the aperture and upon exiting the Bragg cell is imaged by lenses 44 and 46 of the optics network 24 to the plane of an opaque plate 48 also within the optics network 24. A binary optical plate (or hologram) 50 positioned between the lenses 44 and 46 replicates the image of the Bragg cell aperture 42 eight times as shown by representation of the image plane of the opaque plate 48. It should be understood that the binary optical plate 50 may be configured to replicate the image of the Bragg cell aperture 42 a number of times other than eight. In the embodiment shown the binary optical plate 50 was selected to replicate the Bragg cell aperture 42 eight times.

As illustrated in FIG. 4, the opaque plate 48 contains slits of various lengths located where the images of the Bragg cell aperture 42 are replicated. The slits in the opaque plate 48 set the effective length of the Bragg cell aperture for each replication. Again, the number of images and the length of the slits in the opaque plate 48 are by way of example and not by way of limitation. The slit lengths as illustrated in FIG. 4 are in terms of time that it takes a wave in the Bragg cell 22 to travel the length of the slit. For example, the slit lengths (not shown to scale in FIG. 4) vary from 2 ns, 4 ns, 6 ns, 8 ns, 10 ns, 0.1 microseconds, 1 microsecond and 2 microseconds. In order to obtain the power spectrum of each of the aperture images in the opaque plate 48 an anamorphic lense 52 is positioned in the path of light passing through the opaque plate. The anamorphic lense 52 takes the spatial Fourier transform of the light distribution in the slits on the plate 48 with the result that the intensity of light in the focal plane of the anamorphic lense 52 is proportional to the power spectral density of the input signal $S_f(t)$. The anamorphic lense 52 images each of the apertures of the opaque plate 48 in the vertical direction and transforms the image in the horizontal direction. The light from the anamorphic lense 52 is sensed by a detector array 54 that has eight lines of detectors corresponding to the eight slits in the opaque plate 48. The lines of detectors receive and detect light from the corresponding slits in the plate 48.

By operation of the anamorphic lense 52 the image of the slits on the detector 54 is non-overlapping in the vertical direction and performs an alignment of the Fourier transform with the frequency axis in the horizontal direction. Thus, the anamorphic lense 52 images in the vertical direction and transforms in the horizontal direction. This assures that there are eight independent images representing the spectra impinging on the detectors 54. The imaged spectra is oriented in time as in the opaque plate 48, that is, the top spectra in the image is for the 2 microsecond time interval and the spectra for the bottom image is for the 2 ns time interval.

Coupled to the detector array 54 is a focal plane processor 56 that processes the analog outputs from the detector 54 into time and frequency intervals for detection and characterization of pulses in the input signal. A focal plane processor is generally taken to be an electrical analog processor which takes the analog current derived from a detector and performs mathematical operations or algorithms on that current.

Figure 5:
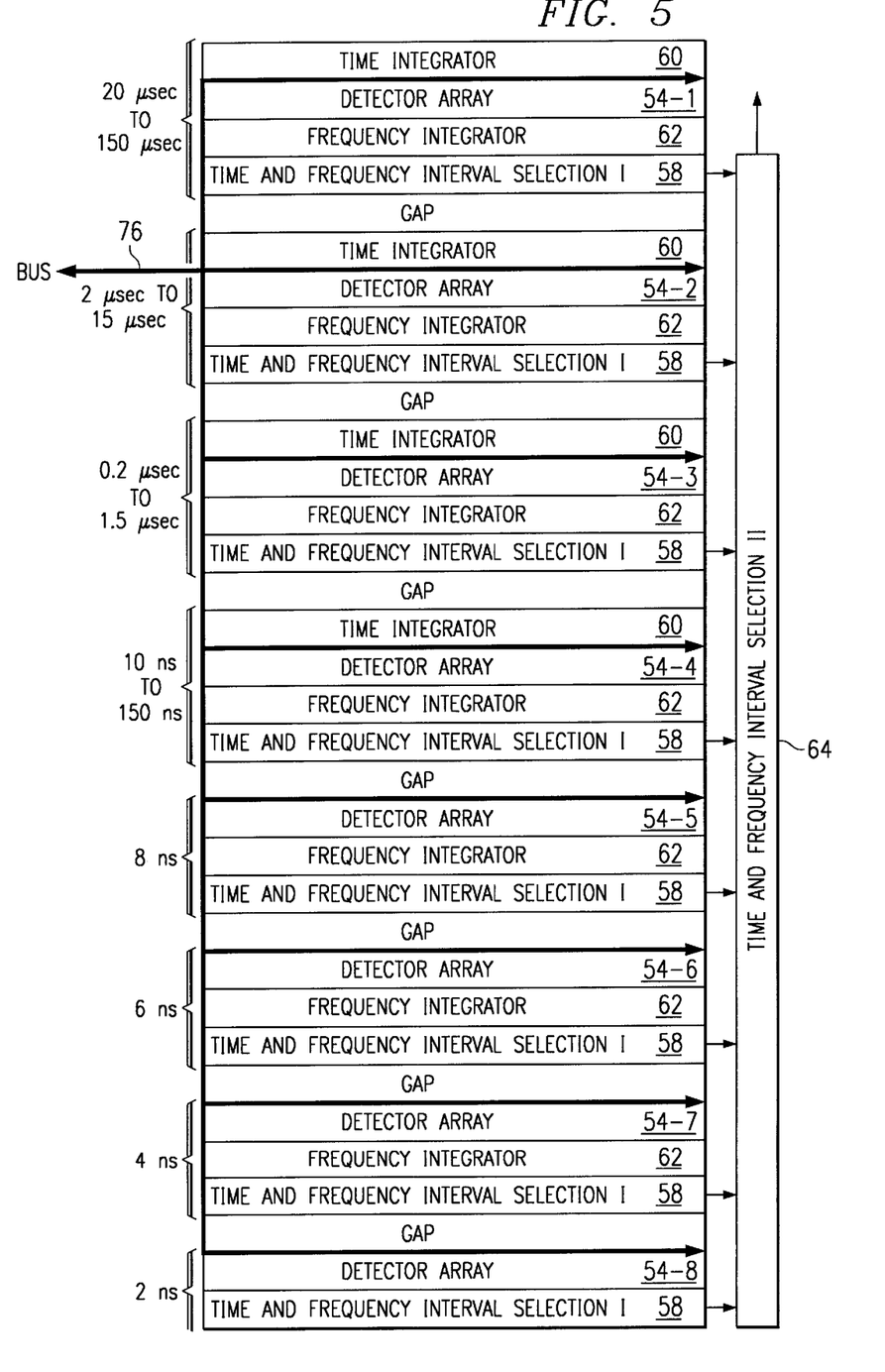
FIG. 5 illustrates the architecture of a detector array and focal plane processor as illustrated in FIG. 4.
Figure 8:
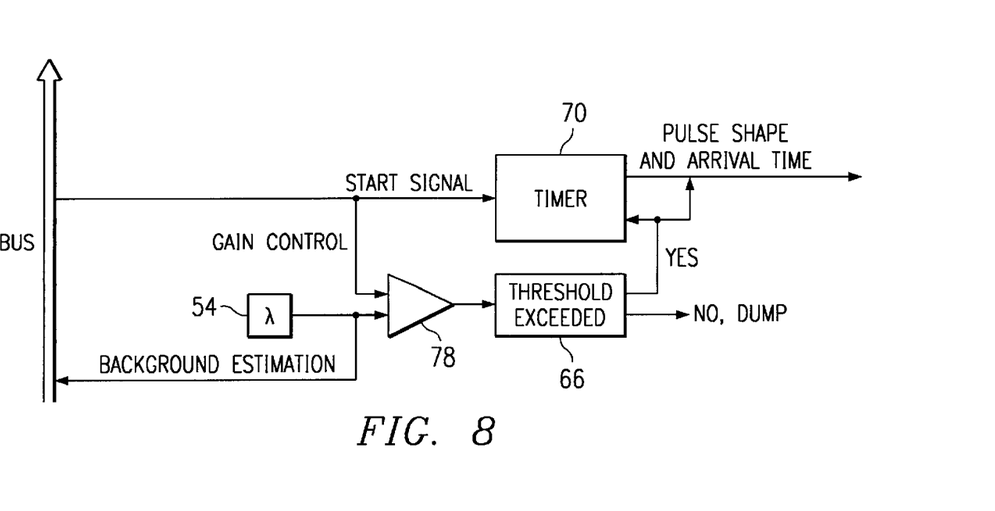

The focal plane processor 56 processes information from the detector array 54 to perform a mathematical operation yielding the detection of pulses in the input signal applied to the Bragg cell 22. The mathematical operations are performed both in time and frequency to yield the time interval and the frequency interval of pulses within the input signal. FIG. 5 illustrates the detector 54 and the focal plane processor 56 comprising the eight detector arrays 54-1 through 54-8 for each of the eight images formed by the anamorphic lense 52 on the detector array 54. Associated with each of the detector arrays 54-1 through 54-4 is a time and frequency interval selection I processor 58, a time integrator 60 and a frequency integrator 62. In order to reduce the need for very fast circuits in the focal plane processor, the focal plane array and processor utilize a somewhat different approach for pulses having a duration of shorter than 10 nanoseconds (ns). The Bragg cell used in this calculation has a bandwidth of 500 MHz. The minimum bandwidth of a 2 ns pulse is also approximately 500 MHz. Hence, there is an assumption that the frequency interval of 2 ns pulse is 500 MHz or greater due to the Bragg Cell limitations. No attempt is made to determine bandwidth for the 2 ns pulse and hence no frequency integrator is provided. The time interval of the pulses shorter than 10 ns is determined by a filter and threshold following the detector as shown in FIG. 8 and will be discussed later. The pulse processing for the 4 ns pulse differs from the 2 ns pulses in that the bandwidth of a 4 ns pulse can range for 250 MHz to the 500 MHz system limit. Hence a frequency integrator is needed to estimate the frequency interval. The 6 ns and 8 ns focal plane processors are the same variety as the 4 ns focal plane processor. The remaining time interval images as illustrated in the opaque plate 48 utilize the time and frequency interval selection I processor 58, the time integrator 60 and the frequency integrator 62 to process pulse signals in the various time slots. As illustrated in FIG. 5 each of the time and frequency interval selection I processors 58 generates an output to time and frequency interval selection II processor 64.

The four longest pulse intervals, namely, 10 ns to 150 ns, 0.2 microseconds to 1.5 microseconds, 2 microseconds to 15 microseconds, and 20 microseconds to 150 microseconds, require both time integration and frequency integration along with the time and frequency interval selection I processor 58. The time integration focal plane processor 60 is needed in these instances since the time intervals to be detected are longer than the slits in the image of the Bragg cell windows.

The outputs of one or more rows of detector arrays, in addition to being processed by the focal plane processor 56, are taken off on bus 76 of the detector array as an estimate of background noise at various points in the spectra. The background noise levels are converted to gain settings in the focal plane processor 56.

Figure 6:
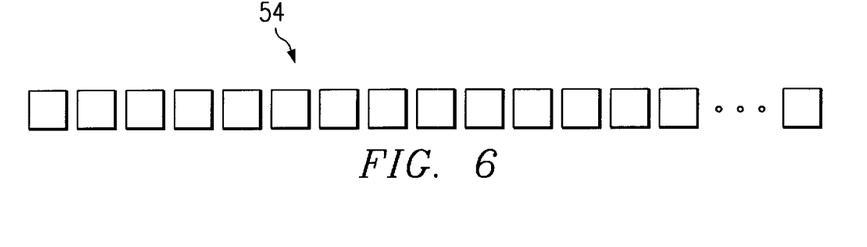
FIG. 6 is a schematic illustration of one of the detector arrays in the architecture schematically illustrated in FIG. 5.

Referring to FIG. 6, there is shown a schematic of one of the detector arrays 54-1 through 54-8. The sizes illustrated in FIG. 6 are typical and there may be as many as 1,000 or more detectors in each array. The number of detectors $N_d$ is set by the frequency resolution and bandwidth, BW, of the focal plane processor 56 as given by the expression:

$$N_d = \frac{BW}{\Delta f}$$

In this example a bandwidth of 512 MHz is used rather than a bandwidth of 500 MHz as set by Bragg cell limitations. The use of this bandwidth simplifies the focal plane processor since the 500 MHz Bragg cell limitation is a nominal limitation and can be, in general, a little wider than 500 MHz. Assuming a 512 MHz bandwidth and a frequency resolution of 0.5 MHz, then:

$$N_d = \frac{BW}{\Delta f} = \frac{512 \text{ MHz}}{0.5 \text{ MHz}} = 1024$$

Figure 7:
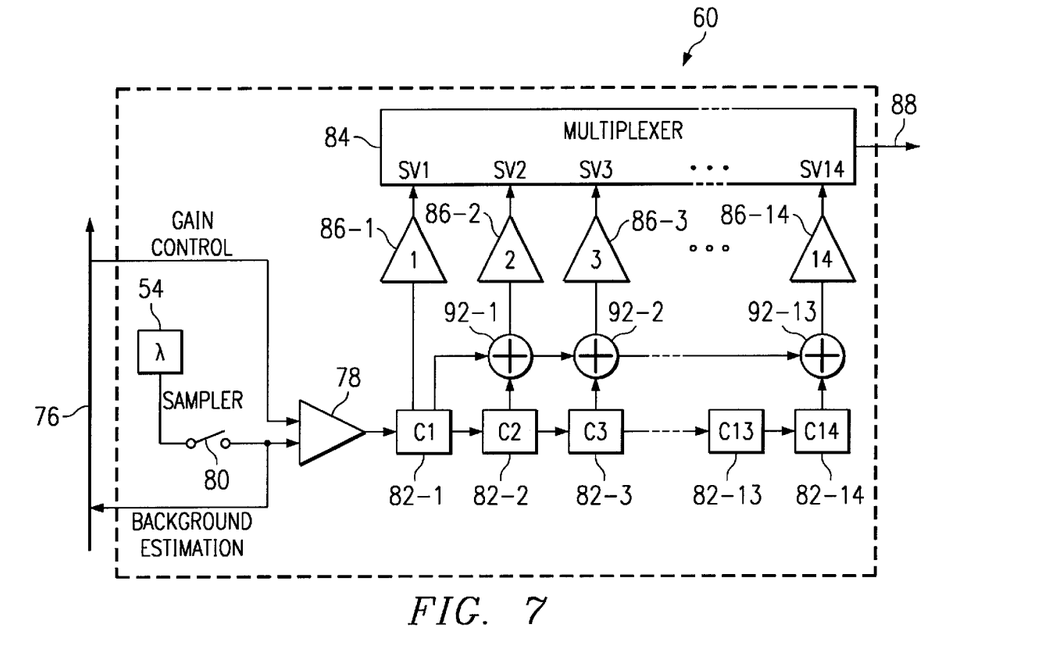
FIGS. 7 and 8 are schematics of the alternate embodiments of the time integrator for a detector and focal plane processor for a matched detection matrix pulse detector.

FIG. 7 is a schematic of a time integrator 60 part of the focal plane processor for the detector arrays 54-1 through 54-4. The output of the detector array 54 on bus line 76 is utilized to determine gain settings of the time integrator 60. There are several strategies that can be used to set the gain of amplifier 78. One such strategy is the following. The gains must be set to help reduce false alarms caused by the noise present with the pulses. Thresholds to reduce false alarms, used in conjunction with gain settings, are present downstream (see FIG. 9) of the portion of the focal plane processor shown in FIG. 7. Included with the spectrum of the pulse is the spectrum of the noise associated with the pulse. The noise can be assumed statistically stationary in intervals long compared to the pulse duration. The power spectral density of the noise is estimated in portions of the record that contains no pulses. A microprocessor that receives detector output from the bus 76 shown in FIG. 7 estimates the power spectral density of the noise. The mean value of the noise spectrum can be removed by high pass filtering the detector output (not shown in FIG. 7) with the cut-on frequency chosen to pass the pulse but reject the mean value of the noise spectrum. Alternatively, the mean value of the noise spectrum could be estimated and subtracted from the detector output immediately after the detector (also not shown in FIG. 7). The net result is that the mean value of the noise spectrum has been removed leaving only the error in the estimate of the noise spectrum. In order that the thresholds of FIG. 9 remain fixed, the gain of each detector is set so that the rms error in the noise spectrum is the same for all detector outputs. It will be seen in the discussion of FIG. 9 that this technique will allow the thresholds to be fixed thereby simplifying the construction of the focal plane processor. The gain control signal is applied to the input of a preamplifier 78 to set the gain thereof for processing the detector array output. The output of a particular detector element in the detector array 54 is sampled by means of a sampler 80 at the Nyquist rate or greater and applied to the input of a preamplifier.

The amplified samples output from the preamplifier 78 are stored on a capacitor 82-1 and read into a storage element SV1 of a multiplexer 84 through an amplifier 86-1. The charges stored in the multiplexer 84 are read out on a line 88 as an input to a frequency integrator 62. The next sample from the detector 54 is stored in the capacitor 82-1 and the previously stored sample is transferred to a capacitor 82-2. The sample stored in the capacitor 82-2 is input to a summing junction 92-1 that also receives the new stored sample from the capacitor 82-1. The latest sample stored in the capacitor 82-1 is read into the storage element SV1 and the sum of the samples read into the capacitors 82-1 and 82-2 is output from the summing junction 92-1 through an amplifier 86-2 and read into a storage element SV2. Again, all the stored charges in the multiplexer 84 are read out on a line 88 to a frequency integrator 62. This process continues with the sample detector outputs sequentially transferred through and stored on the capacitors 82-1, 82-2, 82-3 through 82-14. These samples are summed in the summers 92-1 through 92-13 as illustrated in FIG. 7. The sum of the samples output from each of the summing junctions 92 is applied through an amplifier 86 to a storage element in the multiplexer 84. The process of sampling the detector in detector array 54 and transferring the sample sequentially through the capacitors 82-1 through 82-14 is repeated and when the multiplexer 84 receives a sample in each of the storage elements there will be a total of 14 values which will be read each time a sample is taken and applied to the frequency integrator 62.

The circuitry following detectors in the arrays 54-5, 54-6, 54-7 and 54-8 differs from FIG. 7 and are shown in FIG. 8. The differences are brought about by difficulty of building high speed focal plane processors. As the state of the art of high speed devices advances, the circuitry after the detectors may be the same as in detector arrays 54-1, 54-2, 54-3, and 54-4. As shown in FIG. 8, the sampler is not present, but the gain setting strategy is the same as the other detector arrays. The amplifier 78 sends the incoming signal to a threshold detector 66. The threshold is set to achieve a specified probability of detection for a given false alarm rate. If the threshold is not exceeded, the signal is dumped. If the threshold is exceeded, a timer 70 is stopped and a reading representing the arrival of the pulse is sent to the time and frequency interval selection I processor 58 along with a time record of the signal exceeding the threshold. The timer 70 is cleared and started after a pulse is received or after a predetermined time if no pulse is received. The timer start signal can be sent down the same bus as the gain control signal.

Figure 9:
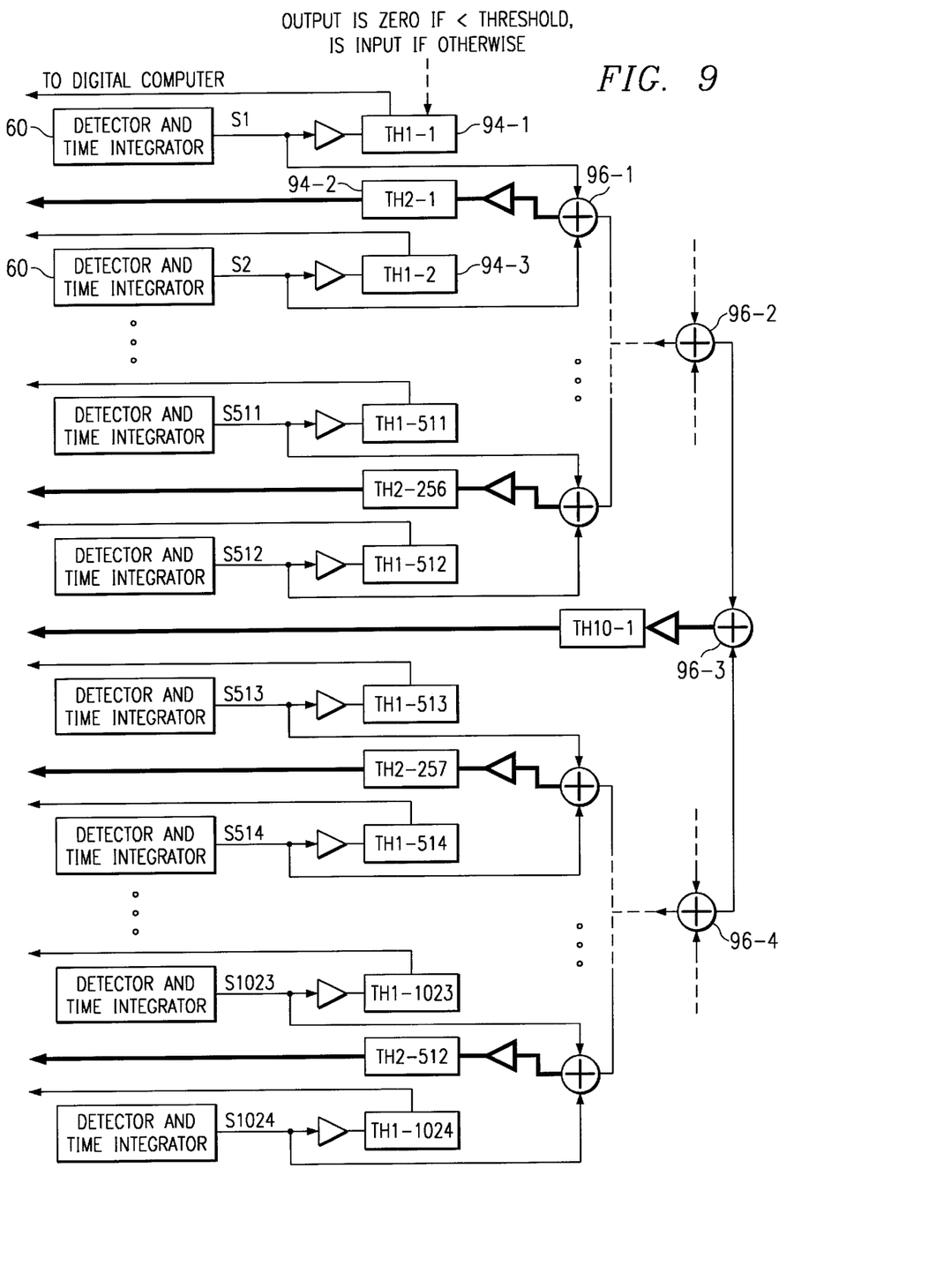
FIG. 9 is a schematic illustration of a frequency integrator for a detector and focal plane processor for an MDM algorithm pulse detector.

FIG. 9 shows a layout of each of the frequency integrators 62 as illustrated in FIG. 5. FIG. 9 illustrates the detector configuration comprising the 1,024 detectors shown in FIG. 6. It should be emphasized that the number of detectors in each detector array 54 varies with the number of resolution elements in the bandwidth of the focal plane processor. For a bandwidth of 500 megahertz, the detector array 54-8 comprises only one resolution element and therefore only one detector in the detector array 54-8. For the detector array 54-7 for the 4 ns aperture as illustrated in FIG. 4, again with an operating bandwidth of 500 megahertz, the detector array 54-7 comprises two resolution elements, that is, two detectors. Thus, the number of resolution elements, that is, the number of detectors in each of the detector arrays 54 is determined in accordance with the equation given above. The most stressing case, in terms of number of resolution elements, is a detector array of 1,024 resolution elements (1,024 detectors). FIG. 9 illustrates the case where the number of detector elements is 1,024. For the detector array 54-8, as previously discussed, the output of the detector array is applied directly to the time and frequency selection I processor 58. For the detector array 54-7 the frequency integrator layout would comprise channels S1 and S2, one channel for each detector in the detector array 54-7.

In operation of the frequency integrator, an output of a time integrator 60 for one detector element of the detector array 54 on the line 88 from the multiplexer 84 is compared to a threshold in a threshold detector 94-1. If that threshold is exceeded, there may be a pulse in the frequency band corresponding to the output of the time integrator 60. When a pulse is present in the frequency band, the time, frequency band, and the value representing magnitude of the signal which exceeded the threshold is output from the threshold detector 94-1 and applied to the time and frequency interval selection I processor 58. For the S1 channel the output of the time integrator 60 is applied to a summing junction 96-1. Also applied to an input of the summing junction 96-1 is the output of the time integrator 60 for the channel S2. The time integrator output on channel S2 is applied to a threshold detector 94-3 and when the threshold is exceeded the time, frequency band and value of the amount the threshold is exceeded is output from the threshold detector 94-3 to the time and frequency interval selection I processor 58.

The summation of the time integrator outputs on channels S1 and S2 in the summing junction 96-1 is compared to a threshold in a threshold detector 94-2. Again, if the threshold set in the threshold detector 94-2 is exceeded, the time, frequency bands of the channels S1 and S2 and the value that the threshold is exceeded is transmitted to the time and frequency interval selection I processor 58. In effect, each individual channel is tested, all 1024 channels, against a threshold and sending the results to to the time and frequency interval selection I processor 58. Then the channels in adjacent pairs are added, now only 512 channels, and again tested against a threshold and send the results to the next processor. This continues until only one pair is left, namely summing junction 96-3. It can readily be shown, that there are ten levels of summation and that the number $N_o$ of outputs summed in level k is:

$$N_o = 2^k$$

Hence, for the array with 1024 detectors, the number of samples summed at each summing junction in the 10 levels considered here are, respectively, 1024, 512, 256, 128, 64, 32, 16, 8, 4, 2.

It should be noted that in FIG. 9 many of the channels between S2 and S511 are not shown to avoid complicating the figure. This is also the situation between channel S514 and S1023 of FIG. 9 wherein a significant number of time integrators are not illustrated with the associated threshold detectors and summing junction to avoid excessively complicating the figure.

Essentially, the frequency integrator searches each detector element for a signal by comparing the output of the multiplexer 84 to a threshold. There may be a signal in the frequency band corresponding to the output of the time integrator when the threshold connected to the integrator is exceeded. However, with reference to channels S1 and S2 (as an example) the threshold of threshold detectors 94-1 and 94-3 may not be exceeded but the sum of the signals for channels S1 and S2, when combined in the summing junction 96-1, may exceed the threshold of the threshold detector 94-2 thereby indicating there may be a signal in the related time intervals and frequency intervals.

Figure 10:
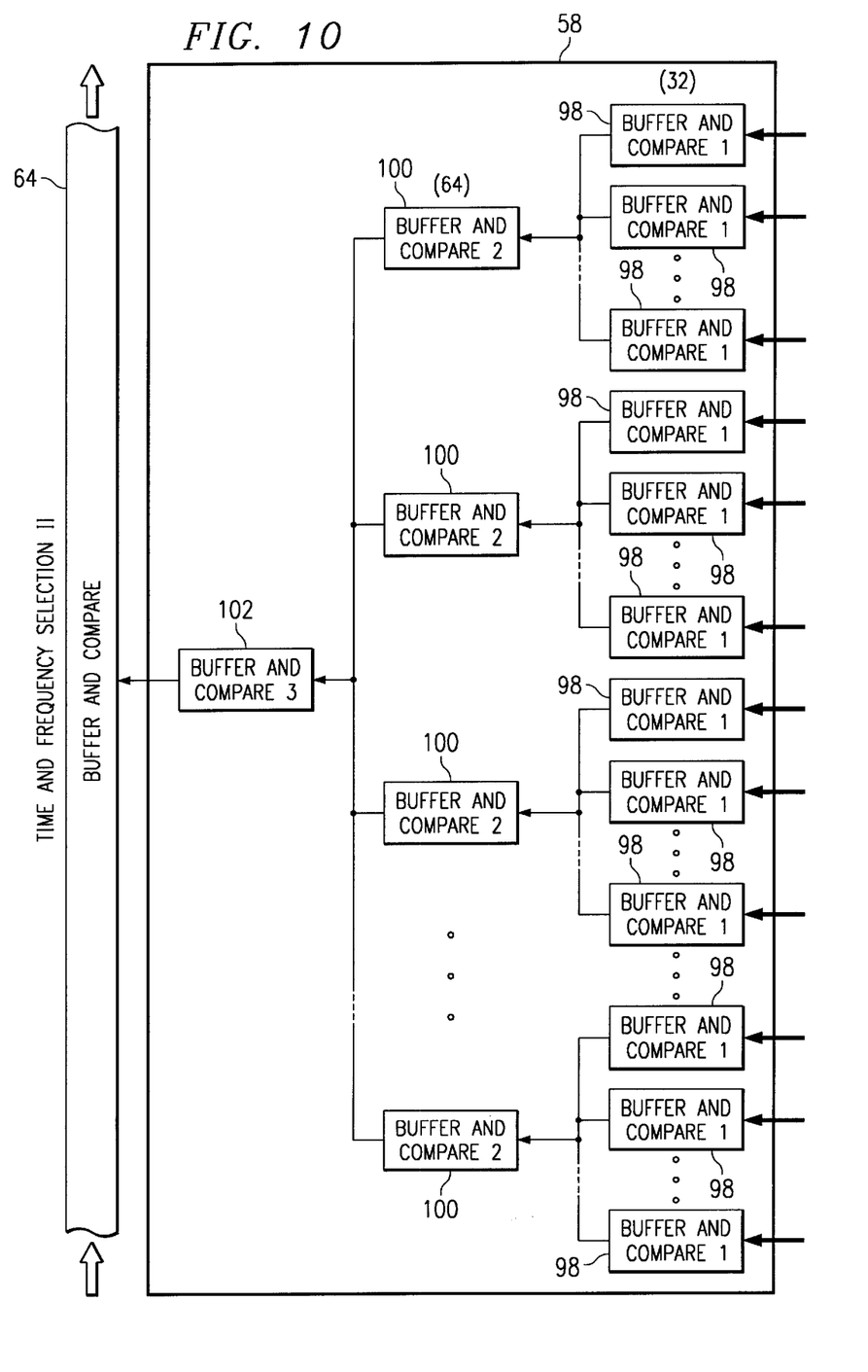
FIG. 10 is a block diagram of a buffer and comparison ladder for time and frequency interval selection I followed by time and frequency interval selection II.

Referring to FIG. 10, there is illustrated a block diagram of the time and frequency interval selection I processor 58 for each of the detector arrays 54-1 through 54-8. The time and frequency interval selection I processor 58 selects and arranges in order from the largest to the smallest the difference between the output of a time integrator 60 and the threshold set in the threshold detectors 94. Again, the initial tuning command selection illustrated in FIG. 10 is a generic representation in that the number of inputs to the initial tuning command selection 58 varies with the number of detectors in the associated detector array. For example, for the detector array 54-8 having one resolution element (one detector), the initial tuning command of FIG. 10 would comprise only one input to a buffer and compare circuit 98. For the detector array 54-7 there are only two resolution elements in the bandwidth and thus three outputs from the time integrator connected to the time and frequency interval selection I processor 58. For the detector array 54-7 only three inputs are applied to buffer and compare circuits 98. Thus, the complexity of the time and frequency interval selection I processor 58 for a particular detector array varies in a similar manner as the frequency integrator as illustrated in FIG. 9. The detector array 54-1 having the most resolution elements and the most detectors would therefore have the most inputs to the initial tuning command selection 58 associated with that detector array.

As mentioned, the time and frequency interval selection process orders the outputs of the threshold detectors of FIG. 9 from the largest threshold difference to the smallest threshold difference. In practice, the pulse characterizer and sub-band tuner will be limited in the number of pulses that can be processed in a given time interval. The result will be that the P largest exceedances per unit time will be sent to the pulse characterizer where P is the largest number that the pulse characterizer can process per unit time. The largest threshold difference is most likely to correspond to a valid pulse.

In operation of the time and frequency interval selection I processor 58, outputs from the interconnected frequency integrator 62 are stored in buffer and compare circuits 98. Of course, where there is no threshold difference the signal input to the buffer and compare circuit is zero indicating no signal exists in the frequency band corresponding to the output of the time integrator 60.

The outputs from the frequency integrator 62 for the detector arrays 54-1 through 54-7 are buffered in the buffer and compare circuits for each detector element and all the buffered values are compared to select the largest threshold difference. In the illustration in FIG. 10 signals from 32 detector elements are buffered. The largest threshold difference for each of the detector elements is transferred to an interconnected buffer and compare circuit 100. Again, the threshold differences received in the buffer and compare circuits 100 from the interconnected buffer and compare circuits 98 are compared and the largest threshold difference is transmitted to a buffer and compare circuit 102. The buffer and compare circuit 102 receives the selection of threshold differences from the buffer and compare circuits 100 and the process of comparing and evaluating the largest threshold differences is made in the buffer and compare circuit 102.

In operation, time and frequency interval selection I processor 58 first sorts outputs of the detector elements in small groups and picks the largest threshold differences for a second sort. Again, the largest threshold differences are sorted in the buffer and compare circuit 102. The output of time and frequency interval selection I processor 58 is the N-largest threshold differences, where N is a selection made upon initialization of the system. These N-largest threshold differences are input to the time and frequency interval selection II characterizer 64.

Considering the example of FIG. 9 showing eight channels S-1 through S-8, there would be eight time and frequency interval selection I processors 58 each having N-largest threshold difference outputs applied to time and frequency interval selection II characterizer 64. Thus, the time and frequency interval selection II characterizer 64 receives N-inputs from each of eight separate time and frequency interval selection I processors 58. For N equal to 10, then the time and frequency interval selection II characterizer 64 receives 80 inputs.

Structurally, the time and frequency interval selection II characterizer 64 is similar to time and frequency interval selection I processor 58. That is, the N times 8 inputs to the selection II characterizer 64 are buffered and compared in stages similar to the selection process for the time and frequency interval selection I processor 58. The P-largest threshold differences input to the time and frequency interval selection II characterizer 64 are output as the signal $S_o(t)$ for sub-band tuning and pulse characterization in the network 20.

Although the invention and the advantages thereof have been described in detail, it should be understood that various changes, substitutions, and alterations are possible without departing from the spirit and scope of the invention as defined by the appended claims and the equivalence thereof.

What is claimed is:

1. A matched detection matrix pulse detector, comprising:
   a collimated beam of light;
   a Bragg cell illuminated by the collimated beam of light, the Bragg cell driven by an input signal containing pulses of various modulations, the cell spatially modulating the collimated beam of light;
   an opaque plate comprising a plurality of apertures each of a selected length;

a binary optical plate or hologram positioned in the modulated collimated beam of light to replicate the image of the Bragg cell aperture a plurality of times in the plane of the optical plate;

an optical lens assembly in the path of the spatially modulated beam of light from the opaque plate, the optical lens assembly generating a spatial Fourier transform of the light distribution thereby resulting in the intensity of light in the focal plane of the optical lens assembly proportional to the power spectral density of the light distribution in the apertures of the opaque plate; and a detector/processor in the focal plane of the optical lens assembly responsive to the light intensity received by the detector/processor and generating output signals.

2. The matched detection matrix pulse detector as in claim 1, wherein the opaque plate further comprises a prism for each elongated opening to direct the spatially modulated collimated beam for the associated opening to a selected area of the focal plane of the optical lens configuration.

3. The matched detection matrix pulse detector as in claim 1, wherein the output signals comprise for selected pulses of the input signal, the time of occurrence, frequency interval and duration of the pulse.

4. The matched detection matrix pulse detector as in claim 1, wherein the elongated opening of the opaque plate vary in length with resolution elements in the bandwidth of the pulses of the input signal.

5. The matched detection matrix pulse detector as in claim 1 wherein the optical system in the path of the spatially modulated light from the opaque plate comprises an anamorphic lens directing the light onto the detector array in such manner to image the apertures in the direction perpendicular to the slit and transformed in the direction parallel to the slit thus forming the power spectral density in the direction parallel to the slit.

6. A matched detection matrix pulse detector, comprising:

a collimated beam of light;

a Bragg cell illuminated by the collimated beam of light, the Bragg cell driven by an input signal containing pulses of various modulations, the cell spatially modulating the collimated beam of light;

an opaque plate comprising a plurality of apertures each of a selected length;

a binary optical plate positioned in the modulated collimated beam of light to replicate the image of the Bragg cell aperture a plurality of times in the plane of the opaque plate;

an optical lens assembly in the path of the spatially modulated beam of light from the opaque plate, the optical lens assembly generating a spatial Fourier transform of the light distribution thereby resulting in the intensity of light in the focal plane of the optical lens assembly proportional to the power spectral density;

a detector array in the focal plane of the optical lens assembly responsive to the light intensity received by the detector array and generating output signals; and a focal plane processor receiving the detector array output signals to generate for selected pulses of the input signal, the time of occurrence, frequency interval and duration of selected pulses.

7. The matched detection matrix pulse detector as in claim 6, wherein the focal plane processor comprises:

a time integrator for pulses of the input signal for sampling selected ones of the detector output signals at a selected rate and generating a time integrated output for the selected output pulses;

a frequency integrator receiving the output of the time integrator and generating an output for input pulses exceeding a threshold; and a tuning command selector for selected ones of a plurality of pulses of the input signal to order the output of the time integrator to identify input pulses that exceed the threshold arranged in order from the largest exceedance to the smallest.

8. The matched detection matrix pulse detector as in claim 7, wherein the focal plane processor further comprises an initial tuning command selection module for selecting a predetermined number of pulses of the input signal based on the order of exceeding the threshold level.

9. The matched detection matrix pulse detector as set forth in claim 6, wherein the elongated openings of the opaque plate vary in length with resolution elements in the bandwidth of the pulses of the input signal.

10. The matched detection matrix pulse detector as in claim 6, further comprising a prism for each of the apertures to focus the spatially modulated collimated beam of light into a spectra of images on the focal plane of the optical lens assembly.

11. A matched detection matrix pulse detector, comprising:

a collimated beam of light;

a Bragg cell illuminated by the collimated beam of light, the Bragg cell driven by an input signal comprising pulses of a plurality of modulations, the cell spatially modulating the collimated beam of light in response to the input signal;

an opaque plate comprising a plurality of apertures each having a selected length;

a first optical lens assembly positioned in the path of the spatially modulated collimated beam of light to image the beam of light to the plane of the opaque plate;

a binary optical plate positioned in the path of the imaged beam of light to replicate the image of the Bragg cell aperture a plurality of times in the plane of the opaque plate;

a second optical lens assembly in the path of the spatially modulated beam of light from the opaque plate, the second optical lens assembly generating a spatial Fourier transform of the light distribution thereby resulting in intensity of light in the focal plane of the second optical lens assembly proportionate to the power spectral density; and a detector/processor in the focal plane of the second optical lens assembly responsive to the light intensity received by the detector/processor and generating an output signal identifying pulses of the input signal.

12. The matched detection matrix pulse detector as in claim 11, wherein the apertures of the opaque optical plate each having a length varying with the duration of pulses of the input signal.

13. The matched detection matrix pulse detector as set forth in claim 12, further comprising a prism for each of the apertures of the opaque plate, each prism focusing the image of the Bragg cell aperture for the associated opening to a selected position on the focal plane of the second optical lens assembly.

14. The matched detection matrix pulse detector as in claim 11, wherein the detector/processor comprises a focal plane processor responsive to the output signal of a detector array for characterizing selected pulses of the input signal the time of occurrence, frequency interval, and duration.

15. The matched detection matrix pulse detector as in claim 14, wherein the focal plane processor comprises:
- a time integrator for selected ones of the pulses of the input signal and generating a time interval signal for the selected pulses;
- a frequency integrator responsive to the time interval signals from the time integrator for comparison to a threshold to identify an input pulse in a frequency band corresponding to pulses processed by the time integrator; and
- a tuning command selector responsive to the output of the frequency integrator to order the pulses exceeding the threshold from the largest values exceeding the threshold to the smallest.

16. A detector and focal plane processor for a matched detection matrix pulse detector, comprising:
- a detector array responsive to an optical image of pulses of an input signal in a given bandwidth;
- a time integrator coupled to the detector array and responsive to signals therefrom, the time integrator sampling the detector output signal at a selected rate and generating an output signal representing the samples of the time integrator;
- a frequency integrator coupled to the output of the time integrator for comparison to a threshold to identify pulses of the input signal in a frequency band corresponding to the time integrator and generating an output varying with time, frequency band, and value exceeding a threshold; and
- a tuning command selector coupled to the frequency integrator and responsive to the outputs therefrom for ordering the identified pulses of the input signal in the order of value exceeding the threshold from the largest to the smallest.

17. The detector and focal plane processor as in claim 16, wherein the time integrator comprises:
- a sample detector for sampling the output of the detector array at the Nyquist rate or greater;
- an amplifier coupled to the sample detector for amplifying the sample output of the detector array;
- a plurality of storage elements sequentially coupled together to the output of the amplifier, a plurality of summing junctions equal in number to one less than the plurality of storage elements and sequentially connected, wherein the first summing junction couples to the first and second storage elements and each subsequent summing junction in the sequence couples to the previous summing junction and to a storage element; and
- a multiplexer coupled to the first storage element of the sequence and to each of the summing junctions for multiplexing samples of the detector array and outputting the multiplexed samples to the frequency integrator.

18. The detector and focal plane processor as in claim 17, wherein the frequency integrator comprises a threshold detector responsive to the output of the time integrator and generating a signal varying in magnitude to the exceedance of the output of the time integrator over a threshold level.

19. The detector and focal plane processor as in claim 16, wherein the detector array comprises a plurality of linearly arranged detector elements and the time integrator samples a selected bandwidth of the detector array.

20. A detector and focal plane processor for a matched detection matrix pulse detector, comprising:
- a detector comprising an array of parallel arranged detector arrays each of the detector arrays responsive to pulses of an input signal within a selected bandwidth;
- a plurality of time integrators individually coupled to one of the detector arrays for sampling the signals therefrom to identify the time of occurrence of pulses in the input signal;
- a plurality of frequency integrators individually coupled to one of the time integrators and responsive to the output thereof for identifying pulses in the input signal within a selected frequency band; and
- a tuning command selection coupled to the plurality of time integrators for arranging the order of the pulses in the input signal from all of the detector arrays of the detector.

21. The detector and focal plane processor as in claim 20, wherein the tuning command selection outputs signals for selected pulses in the input signal based on time of occurrence, frequency interval, and duration of the pulse.

22. The detector and focal plane processor as set forth in claim 20, wherein the frequency integrator compares the output of the time integrator with a threshold and generates an output based on the amount the pulse signal exceeds the threshold.

* * * * *

UNITED STATES PATENT AND TRADEMARK OFFICE
CERTIFICATE OF CORRECTION

PATENT NO. : 6,686,997 B1
DATED : February 3, 2004
INVENTOR(S) : John B. Allen

It is certified that error appears in the above-identified patent and that said Letters Patent is hereby corrected as shown below:

Column 4,
Line 31, after "$\Delta t_I$" delete "ange" and insert -- range --.
Line 42, after "signal" delete "$s_i(t)$" and insert -- $S_i(t)$ --.

Column 7,
Line 7, "Bragg" delete "Cell" and insert -- cell --.
Line 50, after "83-3" insert a space before "through."

Column 8,
Line 66, after "results" delete "to."

Signed and Sealed this

Tenth Day of August, 2004

JON W. DUDAS
*Acting Director of the United States Patent and Trademark Office*